Patented Apr. 30, 1929.

1,711,145

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, A CORPORATION OF DELAWARE.

3'-NITRO-4', 6'-DICHLORO-ORTHO-BENZOYL-BENZOIC ACID AND PROCESS OF MAKING THE SAME.

No Drawing.     Application filed March 26, 1927. Serial No. 178,808.

This invention relates to 3'-nitro-4',6'-dichloro-ortho-benzoyl-benzoic acid and to a process for making the same.

It is an object of our invention to prepare 3'-nitro-4',6'-dichloro-ortho-benzoyl-benzoic acid in a simple and economical way, both because of the importance of the compound itself and more especially because of its value as a starting material for the synthesis of valuable dyestuff intermediates.

Other and further important objects of this invention will become apparent from the following description and the appended claims.

We have discovered that 2',4'-dichloro-ortho-benzoyl-benzoic acid can be nitrated with great ease by the use of a suitable nitrating agent, such as a mixture of sulphuric acid and nitric acid, or a nitrate, under certain conditions, to 3'-nitro-4',6'-dichloro-ortho-benzoyl-benzoic acid.

The reaction is most probably best expressed by the following chemical equation:

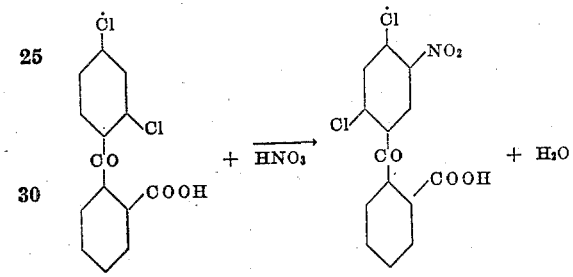

3'-nitro-4',6'-dichloro-ortho-benzoyl-benzoic acid is a white crystalline powder, slightly soluble in hot water but practically insoluble in cold water. It is easily soluble in glacial acetic acid and boiling alcohol, but quite insoluble in benzene and chloroform. It is soluble in dilute caustic soda, sodium carbonate and ammonia solutions.

The sodium salt can be salted out from its solution by the addition of an excess of caustic soda or by adding common salt. The free acid can be crystallized from alcohol and after repeated recrystallization gives a melting point of 174° C.

Without limiting our invention to any particular procedure, the following example illustrates our preferred method of preparation.

*Example.*—Into a flask equipped with an agitator are charged 500 parts of sulphuric monohydrate. While maintaining a temperature of 20–25° C., there are then added 295 parts of 2',4'-dichloro-ortho-benzoyl-benzoic acid and the mass stirred until all is in solution. The solution is then cooled to 10° C. and there are added 407 parts of nitrating acid, analyzing 17% $HNO_3$ and 87% $H_2SO_4$. After all the nitrating acid has been added the nitration mass is agitated for one hour longer. It is then poured into a mixture of 1000 parts of ice and 3000 parts of water and stirred until homogeneous. The product is then filtered off and washed with cold water until practically free of mineral acid. The yield is satisfactory. The melting point of the purified product is 174° C.

We are aware that many changes may be made, and numerous details of the process may be varied through a wide range without departing from the principles of this invention, and we therefore do not purpose limiting the patent granted hereon, otherwise than necessitated by the prior art.

We claim as our invention:

1. As a new article of manufacture, 3'-nitro-4',6'-dichloro-ortho-benzoyl-benzoic acid, having the following chemical constitution.

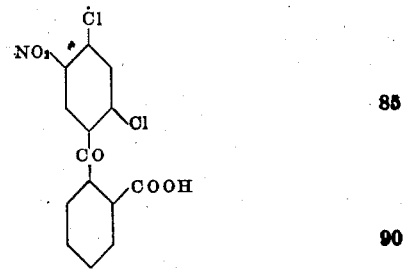

2. A process of preparing 3'-nitro-4',6'-dichloro-ortho-benzoyl-benzoic acid, which comprises treating 2',4'-dichloro-ortho-benzoyl-benzoic acid dissolved in sulphuric acid monohydrate at a temperature of approximately 10° C. with a mixed nitrating acid, diluting with cold water to precipitate the 3′-nitro-4′,6′-dichloro-ortho-benzoyl-benzoic acid and isolating the same.

3. A process of preparing 3′-nitro-4′,6′-dichloro-ortho-benzoyl-benzoic acid, which comprises treating 2′,4′-dichloro-ortho-benzoyl-benzoic acid dissolved in sulphuric acid monohydrate at a temperature of approximately 10° C. with a mixed nitrating acid analyzing 17% $HNO_3$ and 87% $H_2SO_4$, diluting with cold water to precipitate the 3′-nitro-4′,6′-dichloro-ortho-benzoyl-benzoic acid and isolating the same.

In testimony whereof, we have hereunto subscribed our names.

IVAN GUBELMANN.
HENRY J. WEILAND.
OTTO STALLMANN.